US008014649B2

(12) United States Patent
Jang

(10) Patent No.: US 8,014,649 B2
(45) Date of Patent: Sep. 6, 2011

(54) METHOD OF PERFORMING TIME-SHIFT FUNCTION AND TELEVISION RECEIVER USING THE SAME

(75) Inventor: Won Young Jang, Daegu (KR)

(73) Assignee: LG Electronics Inc., Seoul (KR)

( * ) Notice: Subject to any disclaimer, the term of this patent is extended or adjusted under 35 U.S.C. 154(b) by 1281 days.

(21) Appl. No.: 11/501,703

(22) Filed: Aug. 10, 2006

(65) Prior Publication Data

US 2007/0110393 A1 May 17, 2007

(30) Foreign Application Priority Data

Nov. 16, 2005 (KR) .................. 10-2005-0109673

(51) Int. Cl.
*H04N 5/76* (2006.01)
(52) U.S. Cl. ....................................................... 386/235
(58) Field of Classification Search .................. 386/46, 386/83, 95, 200, 213, 229, 235
See application file for complete search history.

(56) References Cited

U.S. PATENT DOCUMENTS

| 6,002,832 A * | 12/1999 | Yoneda ............................. 386/65 |
| 2003/0110514 A1 | 6/2003 | West et al. .................... 725/134 |
| 2003/0193619 A1 | 10/2003 | Farrand ......................... 348/731 |
| 2004/0103434 A1 * | 5/2004 | Ellis ................................ 725/58 |
| 2004/0158874 A1 * | 8/2004 | Ono et al. ..................... 725/131 |
| 2004/0197078 A1 * | 10/2004 | Yoon et al. ...................... 386/46 |
| 2005/0044570 A1 | 2/2005 | Poslinski ........................ 725/48 |

FOREIGN PATENT DOCUMENTS

| CN | 1536886 A | 10/2004 |
| CN | 1668094 A | 9/2005 |
| KR | 10-2002-0092538 A | 12/2002 |
| KR | 10-2003-0040602 A | 5/2003 |
| KR | 10-2004-0023009 A | 3/2004 |
| KR | 10-2004-0095720 A | 11/2004 |
| KR | 10-2005-0081287 A | 8/2005 |
| KR | 1 575 285 A2 | 9/2005 |
| KR | 10-2005-0101767 A | 10/2005 |
| KR | 10-2005-0102659 A | 10/2005 |

OTHER PUBLICATIONS

Chinese Office Action dated Feb. 15, 2008.
Korean Decision to Grant a Patent dated Aug. 31, 2007 issued in Application No. 10-2005-0109673.
European Search Report dated Jun. 7, 2010 issued in Application No. 06 01 6709.

* cited by examiner

*Primary Examiner* — Huy T Nguyen
(74) *Attorney, Agent, or Firm* — KED & Associates, LLP

(57) ABSTRACT

A method of performing a time-shift function and a television receiver using the same provide the time-shift function for at least one channel that is preferred by a user among a plurality of channels that are not currently viewed as well as for a currently viewed channel. The method includes receiving, in real time via at least one tuner, a first composite video signal of a currently viewed channel and a second composite video signal of at least one different channel preferred by a user; respectively processing the first and second composite video signals; storing the first and second composite video signals in a storage medium enabling the time-shift function; and displaying in a real-time display mode at least one of the first and second composite video signals and displaying in a time-shifted display mode at least one of the stored signals reproduced from the storage medium, the at least one real-time-displayed composite video signal and the at least one time-shifted-displayed composite video signal being simultaneously displayed on different screen areas according to according to a user selection of a display mode.

26 Claims, 6 Drawing Sheets

METHOD OF PERFORMING TIME-SHIFT FUNCTION AND TELEVISION RECEIVER USING THE SAME

This application claims the benefit of Korean Patent Application No. 10-2005-0109673, filed on Nov. 16, 2005, which is hereby incorporated by reference as if fully set forth herein.

BACKGROUND OF THE INVENTION

1. Field of the Invention

The present invention relates to television receivers, and more particularly, to a method of performing a time-shift function and a television receiver using the same.

2. Discussion of the Related Art

A contemporary television receiver provides a function for pausing a displayed video signal. For example, while a broadcast signal of one channel is being received and a corresponding video signal is being viewed, the display of the video signal may be paused. It should be noted, however, that the reception of the broadcast signal proceeds in real time. Therefore, unless the television receiver is provided with a video signal storage medium, there will be at least some portion of the received signal lost to the viewer. The lost portion is equal in size to the duration of the pause operation and corresponds to the incoming signal stream received from the time of initiating the pause operation to the point of resuming real-time viewing of a currently received broadcast signal. In other words, upon resumption of the signal that was paused, the viewer will have missed some segment of the broadcast signal, since reception of the real-time-received broadcast signal naturally continued (without viewing) during the pause operation.

To overcome this problem, a television receiver may be provided with a storage medium, such as a hard disc, for storing in real time a video signal broadcast on one channel. To view the stored video content, the display of the real-time broadcast signal is discontinued to enable viewing of a display of the time-shifted content, which is reproduced using audio and video data stored on the hard disc. Typically, such a television receiver provides a display function utilizing an auxiliary area of the screen, e.g., a PIP screen, to enable a viewing of time-shifted content of a received broadcast signal, while a viewing of real-time content continues on the main screen area. Therefore, this television receiver displays a real-time broadcast program, stores the broadcast program being displayed, and reproduces the stored broadcast program, and by enabling the reproduced program to be viewed beginning from some previous point in time, a time-shift function is enabled.

The time-shift function of the above-described contemporary television receiver, however, is applicable to the broadcast program of a currently viewed channel only. That is, if the television receiver is tuned to another (new) channel, i.e., any broadcast or input channel other than a currently viewed channel, there is no existing data storage (prior recording) of the content of the new channel. Thereafter, if a user wishes to view content of the new channel, which is now the currently viewed channel, the time-shift function is ineffectual since there has been no recording of the new broadcast program prior to the point of changing the channel. In other words, any utilization of a time-shift function requires the recording of a video signal (e.g., a broadcast program), so without prior storage, there can be no reproduction on demand. This problem is particularly troublesome in the event that there are two preferred programs respectively broadcast on different channels concurrently, and a user operates the contemporary television receiver to change the tuned channel from a currently viewed channel broadcasting of one preferred program to the other channel broadcasting the other preferred program, in which case the user is unable to view previous content of the secondly tuned channel.

SUMMARY OF THE INVENTION

Accordingly, the present invention is directed to a method of performing a time-shift function and a television receiver using the same that substantially obviates one or more problems due to limitations and disadvantages of the related art.

An object of the present invention is to provide a method of performing a time-shift function and a television receiver using the same, by which the time-shift function can be provided for at least one channel that is preferred by a user among a plurality of channels that are not currently viewed as well as for a currently viewed channel.

Another object of the present invention is to provide a method of performing a time-shift function and a television receiver using the same, by which time-shifted broadcast signals of at least two channels can be simultaneously viewed by a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a television receiver comprising at least one tuner for respectively receiving in real time a first composite video signal of a currently viewed channel and a second composite video signal of at least one different channel preferred by a user; a signal processor for respectively processing the first and second composite video signals; a personal video recorder for enabling a time-shift function by storing the first and second composite video signals and for reproducing the stored signals according to a user selection of the time-shift function; and a controller for generating display control signals according to a user selection of a display mode, to display in a real-time display mode at least one of the first and second received composite video signals and to display in a time-shifted display mode at least one of the stored signals reproduced by the personal video recorder, the at least one real-time-displayed composite video signal and the at least one time-shifted-displayed composite video signal being simultaneously displayed on different screen areas.

According to another aspect of the present invention, there is provided a method of performing a time-shift function in a television receiver. The method comprises receiving, in real time via at least one tuner, a first composite video signal of a currently viewed channel and a second composite video signal of at least one different channel preferred by a user; respectively processing the first and second composite video signals; storing the first and second composite video signals in a storage medium enabling the time-shift function; and displaying in a real-time display mode at least one of the first and second composite video signals and displaying in a time-shifted display mode at least one of the stored signals reproduced from the storage medium, the at least one real-time-displayed composite video signal and the at least one timeshifted-displayed composite video signal being simultaneously displayed on different screen areas according to according to a user selection of a display mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

A television receiver according to the present invention includes at least one tuner for respectively receiving in real time a first composite video signal of a currently viewed channel and a second composite video signal of at least one different channel preferred by a user; a signal processor for respectively processing the first and second composite video signals; a personal video recorder for enabling a time-shift function by storing the first and second composite video signals and for reproducing the stored signals according to a user selection of the time-shift function; a controller for generating display control signals according to a user selection of a display mode, to display in a real-time display mode at least one of the first and second received composite video signals and to display in a time-shifted display mode at least one of the stored signals reproduced by the personal video recorder, the at least one real-time-displayed composite video signal and the at least one time-shifted-displayed composite video signal being simultaneously displayed on different screen areas; a display for displaying the composite video signals selected by the user according to the generated display control signals and according to screen area; and an on-screen display (OSD) generator for generating at least one progress bar representing progress statuses of the composite video signals displayed on the different screen areas, the OSD generator outputting the generated at least one progress bar to the signal processor.

Figure 1A:
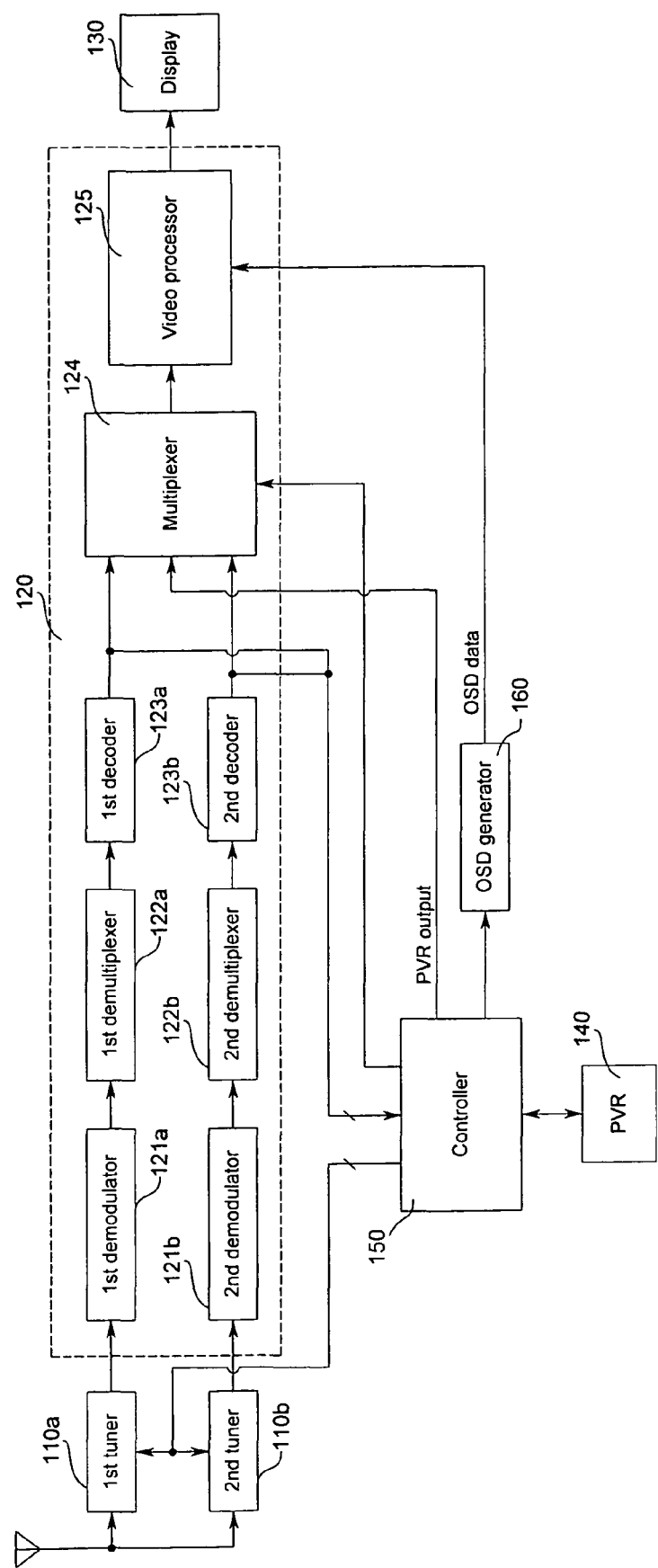
FIG. 1A is a block diagram of a television receiver having a time-shift function according to the present invention.

Referring to FIG. 1A, a television receiver having a time-shift function according to the present invention includes a plurality of tuners 110a and 110b for tuning among a plurality of broadcast channels, a signal processor 120 for respectively processing a plurality of composite video signals corresponding to tuned broadcast channels and outputting the processed signals in a format suitable for display on a screen of a display 130, a personal video recorder (PVR) 140 for storing a composite video signal of a channel for which the time-shift function is set, a controller 150 for setting the time-shift function according to a user selection and for generating a set of control signals, and an on-screen display (OSD) generator 160 for generating an OSD signal.

As shown, the number (i.e., two) of tuners for receiving broadcast channels is taken merely as an example. The plurality of tuners may be embodied by a single digital signal receiving tuner capable of simultaneous tuning of broadcast signals on multiple channels. Alternatively, the plurality of tuners may include at least two analog signal receiving tuners, each capable of receiving a single broadcast signal per channel, or one digital signal receiving tuner and at least one analog signal receiving tuner. That is, in the present embodiments, a pair of tuners 110a and 110b are exemplarily used, but the number of tuners for applying a time-shift function with respect to a multi-window screen could depend on whether a received signal includes a digital signal, an analog signal, or a combination of both.

The tuners are provided to tune broadcast channels that are externally received as a composite video signal, which is processed into a prescribed format by a broadcast signal supply source such as a terrestrial broadcasting station and is then transmitted, i.e., broadcast. In an embodiment of the present invention, a plurality of tuners include the first and second tuners 110a and 110b, enabling the composite video signal of the broadcast channel tuned by the second tuner to be stored in the PVR 140 while a program of the broadcast channel tuned by the first tuner is being viewed. As the time-shift function is applied to a channel that is not currently viewed by a user, e.g., via the second tuner 110b, previous content of the non-viewed channel can be viewed by way of a channel switching or according to a user selection. That is, while the present embodiment shows the time-shift function applied to the broadcast signal of the channel received via the second tuner 110b, it is apparent to those skilled in the art that the currently viewed channel received via the first tuner 110a may be stored in the hard disc of the PVR 140 to apply the time-shift function to the stored signal. In addition, it should be noted that the present invention may further include tuners besides the first and second tuners 110a and 110b, whereby the time-shift function is applicable to multiple signals simultaneously received via a plurality of analog signals or to the multiple signals received via a digital signal receiving tuner, that is, to broadcast signals of several channels received via one tuner.

The signal processor 120 processes the composite video signals received by the first and second tuners 110a and 110b, respectively, and in the example shown includes a first signal processor corresponding to the first tuner and a second signal processor corresponding to the second tuner. The first signal processor includes a first demodulator 121a, a first demultiplexer 122a, and a first decoder 123a. The second signal processor includes a second demodulator 121b, a second demultiplexer 122b, and a second decoder 123b. Thus, a composite video signal is received by the first tuner 110a, is demodulated by the first demodulator 121a, and is then separated by the first demultiplexer 122a into audio and video signals, which are then decoded by the first decoder 123a.

Meanwhile, a composite video signal received by the second tuner 110b is likewise processed via the second demodulator 121b, second demultiplexer 122b, and second decoder 123. Since the composite video signal typically includes PSIP data corresponding to each channel, each of the first and second decoders 123a and 123b includes a program and service information protocol (PSIP) decoder and an electronic program guide (EPG) decoder, to recognize data such as broadcast program information and additional information of a broadcast signal received via each channel.

The signal processor 120 is further provided with a multiplexer 124 for selecting at least one signal from among the signals output from the first and second decoders 123a and 123b and signals reproduced by the PVR 140 and relayed via the controller 150. Thus, under control of the controller 150, the multiplexer 124 outputs the at least one selected signal to the video processor 125. The signal processor 120 is also provided with a video processor 125 for converting the composite video signals output from the signal processor to a format suitable for display on a screen of the display 130. That is, under control of the controller 150, the video processor 125 scales the composite video signal output from the first or second decoder 123a or 123b, to output a video display signal of a prescribed screen size, resolution, etc., and combines the OSD signal output from the OSD generator 160 and the decoded composite video signal, for simultaneous (superposed) display by the display 130, which may be a cathode-ray tube or a type of flat-panel display such as a liquid crystal display or plasma display panel.

The PVR 140 stores the composite video signals received by either of the first and second tuners 110a and 110b and includes a hard disc (not shown) as a storage medium, a prescribed file input/output interface (not shown), and other known elements for outputting recorded video signals via the controller 150 for display on the display 130. The general configuration of the PVR 140 is well known.

The OSD generator 160 provides a user interface enabling a time-shift function, a channel switching, and the like and for this purpose enables a display of OSD data, which may be in the form of a menu window for selecting a time-shift mode, a menu window for verifying additional information of a currently received channel, and progress bars with position indicators for representing a current progress status of a currently viewed channel and for enabling a user control of the time-shift function. The OSD data is displayed on a screen of the display 130 under the control of the controller 150.

Figure 1B:
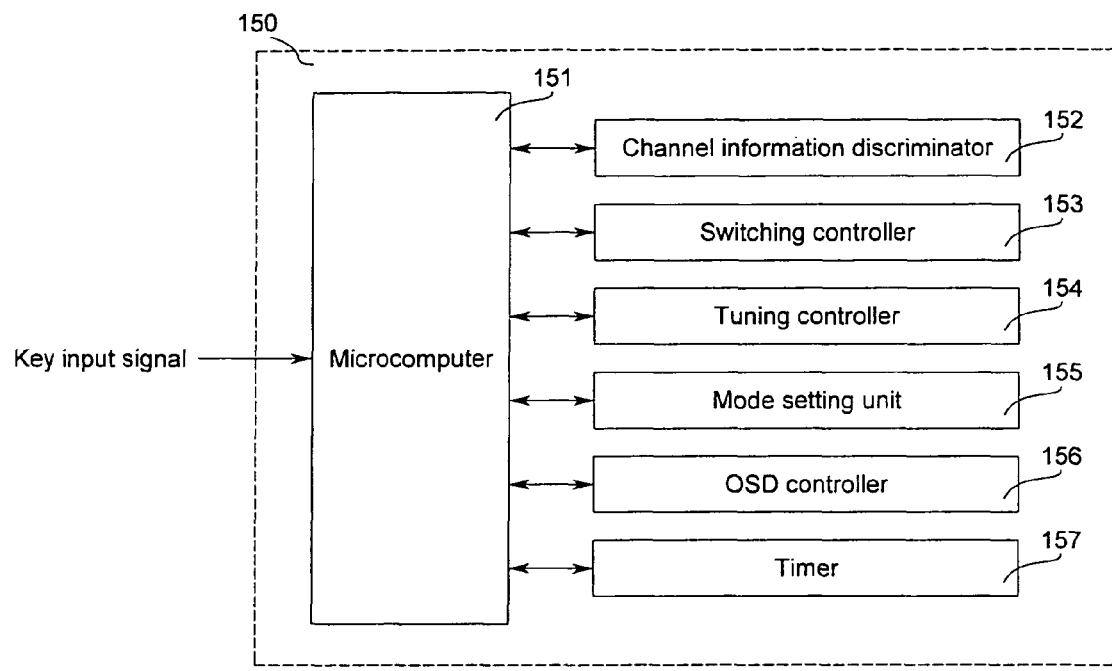
FIG. 1B is a detailed block diagram of the controller of FIG. 1.

As shown in FIG. 1B, the controller 150 includes a microcomputer 151 receiving a key input signal from the user and communicating with a channel information discriminator 152, a switching controller 153, a tuner controller 154, a mode setting unit 155, an OSD controller 156, and a timer 157. Besides controlling the PVR 140, the controller 150 discriminates a channel currently viewed by a user and controls the time-shift function to be set for at least one of the channel currently viewed by the user and for other channels. That is, the channel information discriminator 152 discriminates a variety of information included in the received composite video signal, such as channel information, genre (sports, movies, news, etc.) information, viewer or broadcast rating information specific to the program, subchannel information, and information for an auxiliary area of the screen. This information is discriminated from the received PSIP data and particularly included in the currently viewed composite video signal. The microcomputer 151 controls the channel information discriminator 152, switching controller 153, tuner controller 154, mode setting unit 155, OSD controller 156, and timer 157 according to the key input signal.

The switching controller 153 controls the composite video signal of the selected broadcast channel to be stored in the hard disc of the PVR 140 and/or to be displayed on the display 130, in response to the key input signal selecting a channel to be stored in the PVR. For instance, to view the composite video signal received from the first tuner 110a in real time and to record the composite video signal received from the second tuner 110b in the PVR 140, the switching controller 153 controls the composite video signal output from the first decoder 123a to be output via the display 130 in real time and controls the composite video signal output from the second decoder 123b to be stored in the hard disc. In other words, in attempting to display the composite video signal stored in the hard disc using the time-shift function, the composite video signal output from the first decoder 123a is controlled so that it may not be output to the display 130 while the composite video signal stored in the PVR 140 is controlled so that it may be output to the display.

The tuner controller 154 controls the first and second tuners 110a and 110b according to the key input signal selecting a channel to be viewed in real time and a channel to be stored in the PVR 140. For instance, the tuner controller 154 controls the tuners 110a and 110b according to a user selection identifying various modes, including a mode of selecting a channel adjacent to the currently viewed channel, a mode of selecting a channel of the same genre of the currently viewed broadcast channel, a mode of selecting one of a plurality of subchannels, and a mode of selecting an auxiliary (PIP) screen area. The mode setting unit 155 enables such modes to be set by a user selection, including modes of an adjacent channel recording mode, a same genre channel recording mode, a subchannel recording mode, and an auxiliary screen area channel recording mode. The mode setting unit 155 also enables a setting of a channel switching reference time in conjunction with the timer 157. Meanwhile, the OSD controller 156 controls the OSD generator 160 to output an OSD signal according to a key input signal selection made by the user.

According to the present invention, in viewing the composite video signal received by the first tuner 110a, a channel adjacent to the currently viewed channel is received by the second tuner 110b to be stored so that the time-shift function is enabled. Hence, the time-shift function is applicable to an adjacent channel having the highest possibility of being viewed in the future as well as to the currently viewed channel. The time-shift function is also applicable by storing, via the second tuner 110b, content of a channel of the same genre as the currently viewed broadcast channel, so that a time-shift function may be applied to a channel of a genre preferred by the user. Meanwhile, in the case of digital broadcasting, where several subchannels may exist in one physical channel, at least one of the corresponding subchannels is stored via the second tuner 110b and the time-shift function is then applied to the stored subchannel content. For a simultaneous viewing of more than one broadcast program using, for example, a picture-in-picture (PIP) screen, picture-out-picture (POP) screen, or similar auxiliary-type viewing area or window, the auxiliary broadcast program is stored after reception via the second tuner 110b. Then, a time-shift function is applied to the stored broadcast program to enable missed portions of the received broadcast program to be viewed based on a time-shifted signal, i.e., the stored signal subsequently displayed on the auxiliary area. In practice, with the presence of multiple screens, including a smaller screen (e.g., a PIP screen) or a remote screen (e.g., a POP screen), the likelihood of a user missing at least some portion of a broadcast program increases the need for the time-shift function.

A method of performing a time-shift function in a television receiver according to the present invention includes steps of receiving, in real time via at least one tuner, a first composite video signal of a currently viewed channel and a second composite video signal of at least one different channel preferred by a user; respectively processing the first and second composite video signals; storing the first and second composite video signals in a storage medium enabling the time-shift function; displaying in a real-time display mode at least one of the first and second composite video signals and displaying in a time-shifted display mode at least one of the stored signals reproduced from the storage medium, the at least one real-time-displayed composite video signal and the at least one time-shifted-displayed composite video signal being simultaneously displayed on different screen areas according to according to a user selection of a display mode; and displaying at least one progress bar for representing progress statuses of the composite video signals displayed on the different areas of the screen. The method of the present invention is primarily executed by the controller 150.

First Embodiment

Figure 2:
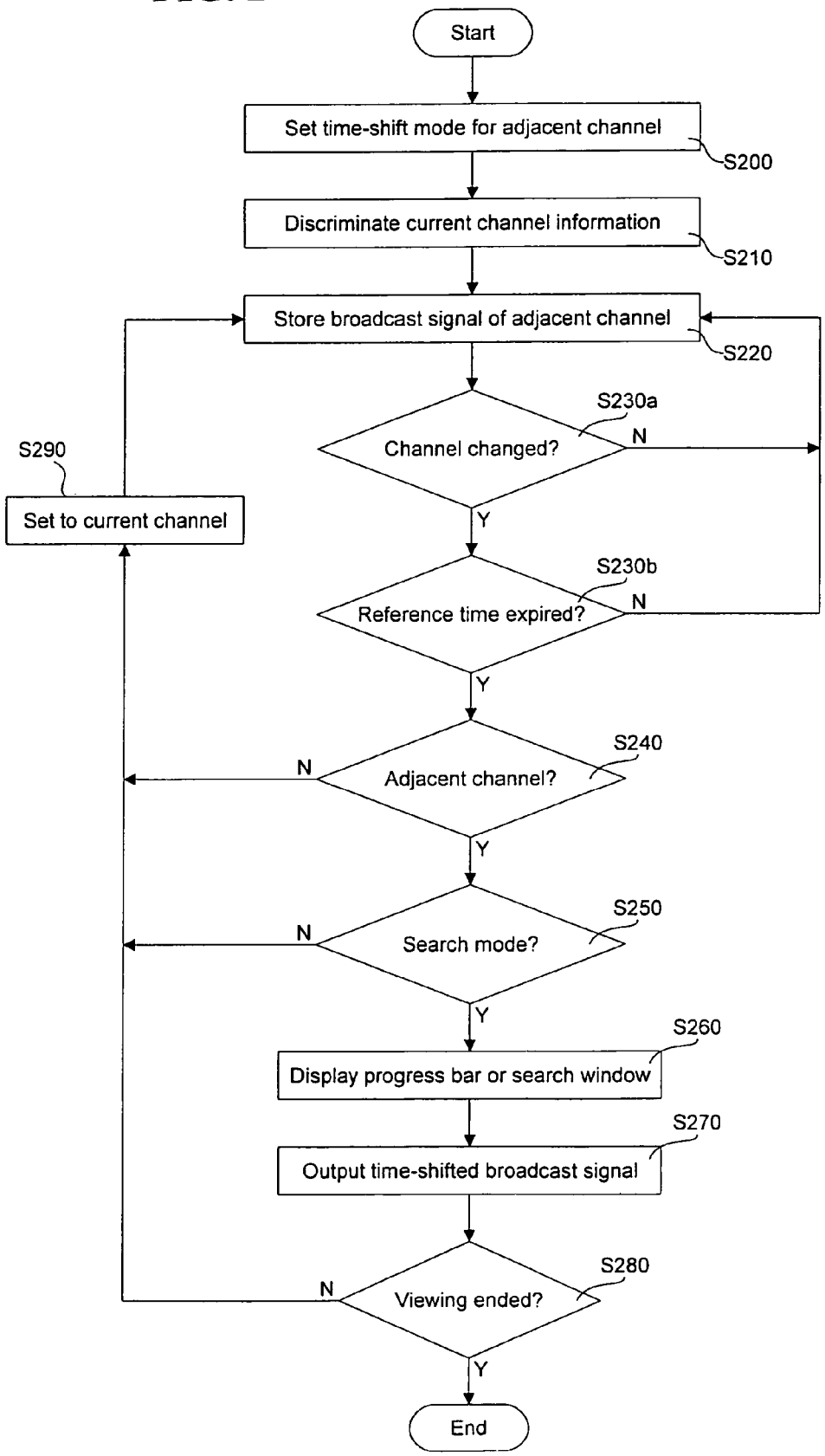
FIG. 2 is a flowchart of a method of controlling a television receiver having a time-shift function according to a first embodiment of the present invention.

Referring to FIG. 2, illustrating a method of controlling a television receiver having a time-shift function according to a first embodiment of the present invention, the time-shift function is applied to a channel adjacent to a currently viewed channel (S200). Upon setting the time-shift function accordingly, the controller 150 discriminates channel information for the currently received channel from the PSIP data (S210). That is, the received broadcast signal includes PSIP data, which is output from the first decoder 123*a* to the controller 150, where the decoded data is discriminated in the channel information discriminator 152 to determine a channel number of a currently received channel. Then, based on the channel number of the currently received channel, the tuning controller 154 of the controller 150 controls the second tuner 110*b* to receive (tune to) an adjacent channel. Here, the adjacent channel may be the channel occurring immediately above or below the currently viewed channel—similar to a channel obtained by operating a channel up/down key. Meanwhile, however, viewing of the current channel may proceed.

Upon tuning to the adjacent channel, the controller 150 controls the switching controller 153 so that the corresponding broadcast signal is processed via the second demodulator 121*b*, second demultiplexer 122*b*, and second decoder 123*b* and is then stored in the hard disc of the PVR 140 (S220). While the above storage proceeds, the controller 150 continuously discriminates the channel information to determine whether the user performs a channel changing operation to change the currently viewed channel (S230*a*). During this time, i.e., if no channel changing operation is detected, storage of the adjacent channel continues according to the step S220. For example, though a channel changing operation may be detected, the change may be incidental or the duration of viewing the new channel may be very short, so it should be determined whether the channel changing operation represents a persistent (sustained) viewing of the new channel. Therefore, if a channel changing operation is detected, it is determined whether a viewing time of a recently changed channel exceeds a reference time using the timer 157 (S230*b*). The reference time is predetermined to prevent the system from reacting to a momentarily viewed channel—as in the case of a user quickly stepping through several channels in rapid succession.

If a persistent viewing of a new channel is determined, i.e., if the reference time is exceeded, it is determined whether the new channel corresponds to a channel adjacent to the previously viewed channel (S240). Here, the adjacent channel is the channel whose broadcast signal was stored in the PVR 140 to enable a time-shift function. For a determination of the channel changing operation resulting in a persistent viewing of the adjacent channel, according to the steps S230*a* and S230*b*, the controller 150 determines using the mode setting unit 155 whether a search mode is entered, which requires the OSD generator 160 to display a progress bar or search window enabling a user control of the time-shift function. That is, it is determined whether the user attempts to search and view previously stored content, such as past scenes, of the adjacent channel (S250). If so, the controller 150 enables control of the time-shift function by displaying a progress bar or a search window on the screen via the OSD generator 160 (S260). A position indicator on the progress bar may then be moved to a specific position, corresponding to the time of a past scene, the controller 150 controls the PVR 140 to display the stored broadcast signal of the channel from the time-shifted position, to output video data to the video processor 125 by reading the video data stored in the PVR 140 (S270). Thus, the stored broadcast signal is reproduced according to the user selection and manipulation of the time-shift function, to enable viewing of past content of a channel adjacent to a currently viewed channel.

At any time during the above viewing, the controller 150 may detect a user selection or command signal to terminate viewing (S280). In the absence of such detection, display of the broadcast signal of the currently viewed channel and storage of the adjacent channel, to which the time-shift function is applied, continues under the operation of the controller 150 and the PVR 140. While viewing thus continues, and if the channel of discriminated in the step S240 is a channel other than the "adjacent" channel or if no search is attempted, the channel obtained in the step S230*a* is set as the new "currently viewed" channel (S290). Accordingly, the second tuner 110*b* and the PVR 140 are controlled as before, to store in the step S220 the channel adjacent to the newly viewed channel.

In the first embodiment of the present invention, the television receiver includes a pair of the tuners 110*a* and 110*b* for example. Yet, as mentioned in the foregoing description, one (digital) or at least two (analog) tuners may be used, and the number may depend on whether the broadcast signals to be received are digital or analog. For instance, both adjacent channel, i.e., the channel immediately above and below a currently viewed channel, may be simultaneously received via a pair of analog-type tuners, and a time-shift function can be applied to both channels accordingly.

Second Embodiment

Figure 3:
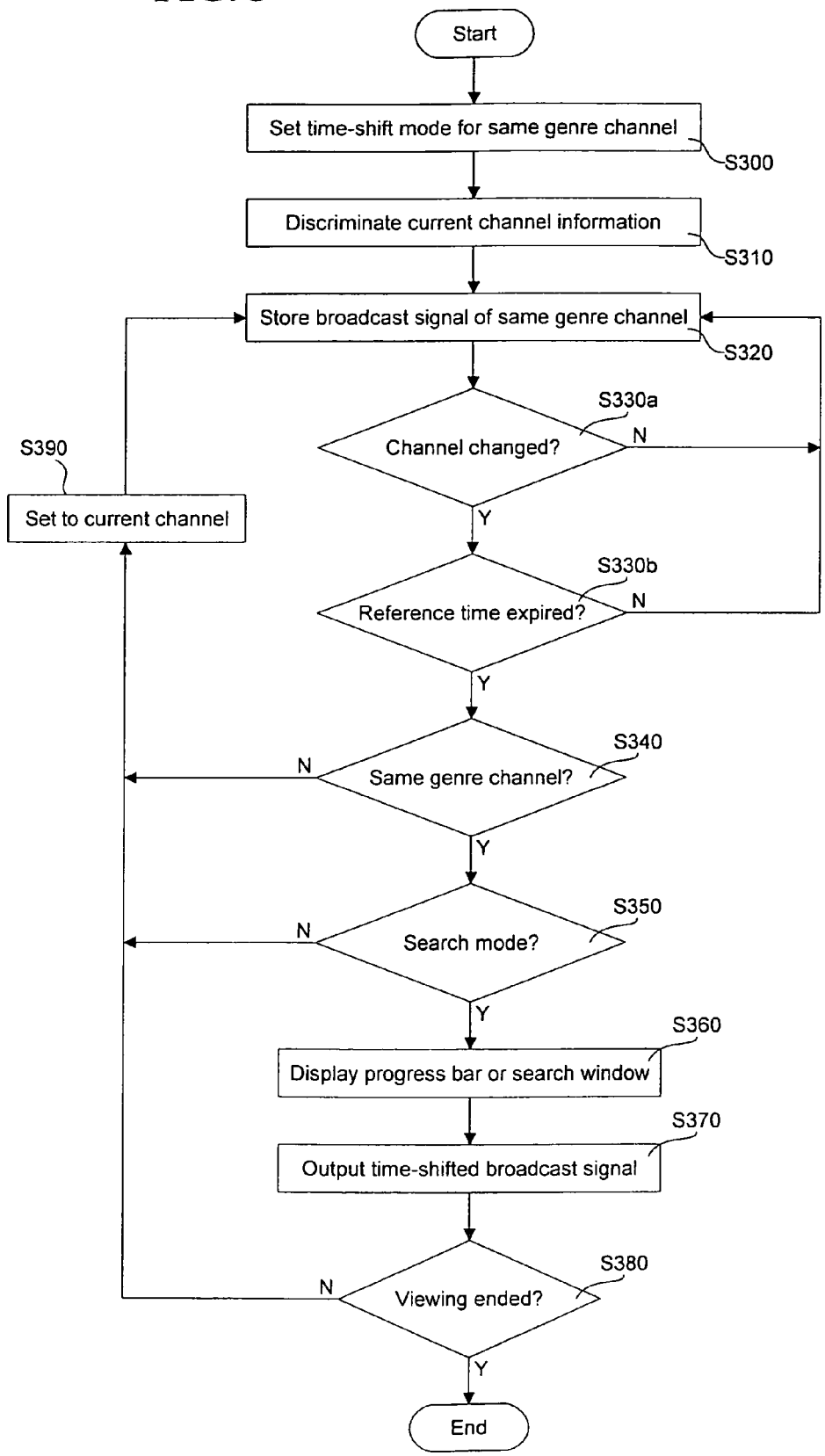
FIG. 3 is a flowchart of a method of controlling a television receiver having a time-shift function according to a second embodiment of the present invention.

Referring to FIG. 3, illustrating a method of controlling a television receiver having a time-shift function according to a second embodiment of the present invention, the time-shift function is applied to a channel of the same genre as a currently viewed channel (S300). Upon setting the time-shift function accordingly, the controller 150 discriminates genre information for the currently received channel from the PSIP data, by searching EPG information included in the PSIP data (S310). That is, the received broadcast signal includes PSIP data, which is output from the first decoder 123*a* to the controller 150, where the decoded data is discriminated in the channel information discriminator 152 to determine a genre of a currently received channel. Then, based on the genre of the currently received channel, the tuner controller 154 of the controller 150 controls the second tuner 110*b* to receive (tune to) a same genre channel. Here, the same genre channel may be the channel carrying a sports program, a movie program, a news program, etc., as desired by the user. Meanwhile, however, viewing of the current channel may proceed.

Upon tuning to the same genre channel, the controller 150 controls the switching controller 153 so that the corresponding broadcast signal is processed via the second demodulator 121*b*, second demultiplexer 122*b*, and second decoder 123*b* and is then stored in the hard disc of the PVR 140 (S320). While the above storage proceeds, the controller 150 continuously discriminates the channel information to determine whether the user performs a channel changing operation to change the currently viewed channel (S330*a*). During this time, i.e., if no channel changing operation is detected, storage of the same genre channel continues according to the step S320. If a channel changing operation is detected, it is determined whether a viewing time of a recently changed channel exceeds a reference time using the timer 157 (S330*b*).

If a persistent viewing of a new channel is determined, i.e., if the reference time is exceeded, it is determined whether the new channel corresponds to a channel of the same genre as the previously viewed channel (S340). Here, the same genre channel is the channel whose broadcast signal was stored in the PVR 140 to enable a time-shift function. For a determination of the channel changing operation resulting in a persistent viewing of the same genre channel, according to the steps S330*a* and S330*b*, the controller 150 determines using the mode setting unit 155 whether a search mode is entered, which requires the OSD generator 160 to display a progress bar or search window enabling a user control of the time-shift function. That is, it is determined whether the user attempts to search and view previously stored content, such as past scenes, of the same genre channel (S350). If so, the controller 150 enables control of the time-shift function by displaying a progress bar or a search window on the screen via the OSD generator 160 (S360). A position indicator on the progress bar may then be moved to a specific position, corresponding to the time of a past scene, the controller 150 controls the PVR 140 to display the stored broadcast signal of the channel from the time-shifted position, to output video data to the video processor 125 by reading the video data stored in the PVR 140 (S370). Thus, the stored broadcast signal is reproduced according to the user selection and manipulation of the time-shift function, to enable viewing of past content of a channel having the same genre as a currently viewed channel.

At any time during the above viewing, the controller 150 may detect a user selection or command signal to terminate viewing (S380). In the absence of such detection, display of the broadcast signal of the currently viewed channel and storage of the same genre channel, to which the time-shift function is applied, continues under the operation of the controller 150 and the PVR 140. While viewing thus continues, and if the channel of discriminated in the step S340 is a channel other than the "same genre" channel or if no search is attempted, the channel obtained in the step S330*a* is set as the new "currently viewed" channel (S390). Accordingly, the second tuner 110*b* and the PVR 140 are controlled as before, to store in the step S320 the channel of the same genre as the newly viewed channel.

In the second embodiment of the present invention, a time-shift function is applied to a currently viewed channel and a channel having a same genre. The second embodiment, however, is also applicable to channels discriminated relative to a viewer rating, broadcast rating, or any other classification enabled by the PSIP data and EPG information. Here, as in the case of the first embodiment, a pair of the tuners 110*a* and 110*b* are exemplarily used. Yet, if there are concurrent broadcasts on several same genre (viewer rating, broadcast rating, etc.) channels, one of the several channels should be selected. For this, one of the nearest (most adjacent) channels of the same genre, one of the channels of a genre corresponding to a preset rating, or a channel directly selected by a user from several channels displayed on a menu window may be recorded. A corresponding setting is enabled using PSIP and EPG information. According to whether signals are analog or digital, one (digital) or at least three (analog) tuners may be used in applying a time-shift function to at least two channels of the same genre as well as to a currently viewed channel.

Third Embodiment

Figure 4:
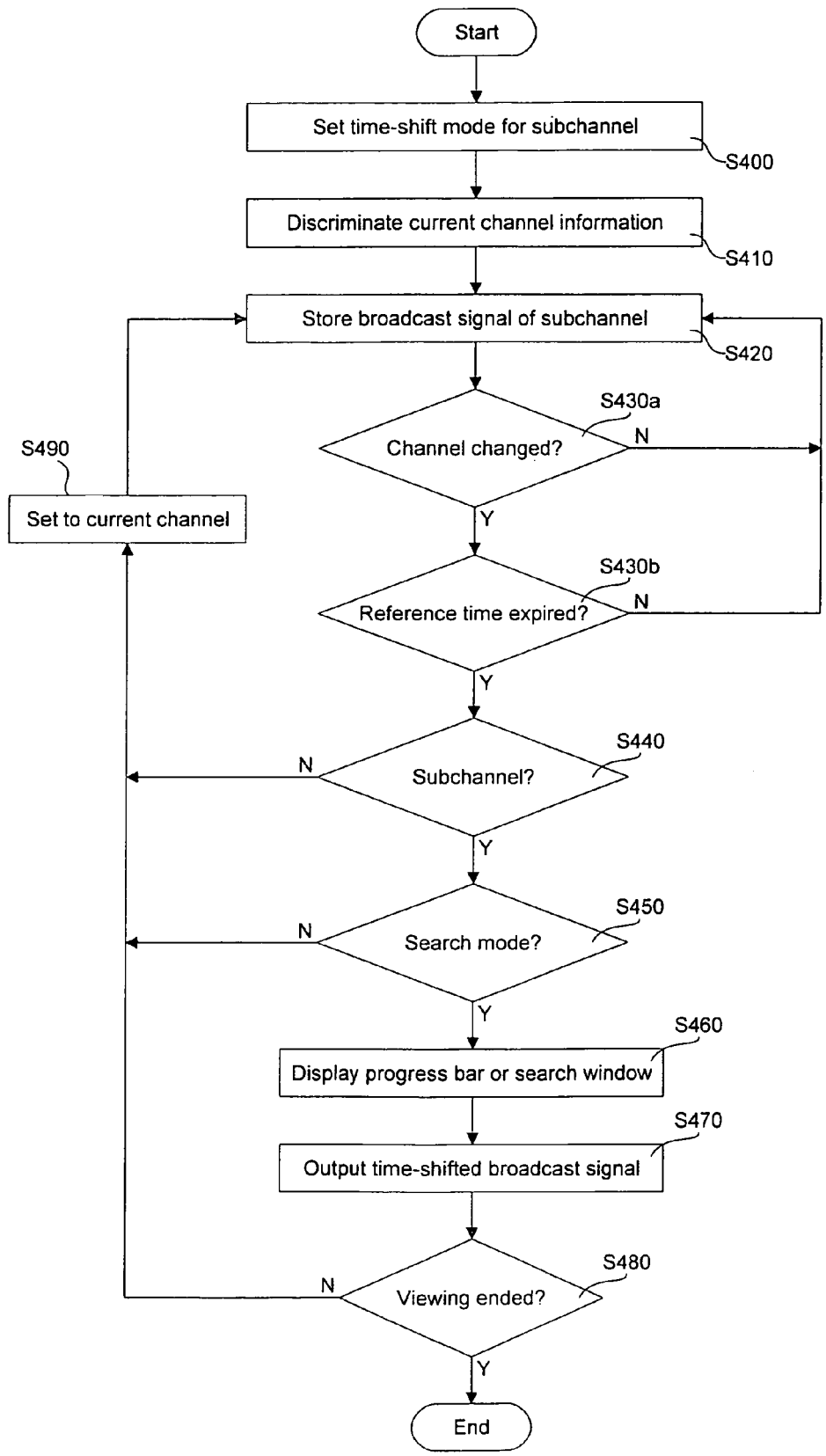
FIG. 4 is a flowchart of a method of controlling a television receiver having a time-shift function according to a third embodiment of the present invention.

Referring to FIG. 4, illustrating a method of controlling a television receiver having a time-shift function according to a third embodiment of the present invention, the time-shift function is applied to at least one subchannel of a currently viewed channel (S400). Upon setting the time-shift function accordingly, the controller 150 discriminates subchannel information for the currently received channel from the PSIP data, by searching EPG information included in the PSIP data to determine whether a subchannel exists (S410). For digital broadcasts, each physical channel includes at least one subchannel, and if several subchannels exist within one physical channel, at least one of the several subchannels needs to be selected. For this, a portion of the subchannels is set by the user using a system program, according to a high channel number sequence or a subchannel, or the system program is used to set channels corresponding to type according to user preference.

Upon tuning to the at least one subchannel, the controller 150 controls the switching controller 153 so that the corresponding broadcast signal is processed via the second demodulator 121*b*, second demultiplexer 122*b*, and second decoder 123*b* and is then stored in the hard disc of the PVR 140 (S420). While the above storage proceeds, the controller 150 continuously discriminates the channel information to determine whether the user performs a channel changing operation to change the currently viewed channel (S430*a*). During this time, i.e., if no channel changing operation is detected, storage of the at least one subchannel continues according to the step S420. If a channel changing operation is detected, it is determined whether a viewing time of a recently changed channel exceeds a reference time using the timer 157 (S430*b*).

If a persistent viewing of a new channel is determined, i.e., if the reference time is exceeded, it is determined whether the new channel corresponds to a subchannel of the previously viewed channel (S440). Here, the subchannel is a channel whose broadcast signal was stored in the PVR 140 to enable a time-shift function. For a determination of the channel changing operation resulting in a persistent viewing of the subchannel, according to the steps S430*a* and S430*b*, the controller 150 determines using the mode setting unit 155 whether a search mode is entered, which requires the OSD generator 160 to display a progress bar or search window enabling a user control of the time-shift function. That is, it is determined whether the user attempts to search and view previously stored content, such as past scenes, of the subchannel (S450). If so, the controller 150 enables control of the time-shift function by displaying a progress bar or a search window on the screen via the OSD generator 160 (S460). A position indicator on the progress bar may then be moved to a specific position, corresponding to the time of a past scene, the controller 150 controls the PVR 140 to display the stored broadcast signal of the channel from the time-shifted position, to output video data to the video processor 125 by reading the video data stored in the PVR 140 (S470). Thus, the stored broadcast signal is reproduced according to the user selection and manipulation of the time-shift function, to enable viewing of past content of a subchannel of a currently viewed channel.

At any time during the above viewing, the controller 150 may detect a user selection or command signal to terminate viewing (S480). In the absence of such detection, display of the broadcast signal of the currently viewed channel and storage of the subchannel, to which the time-shift function is applied, continues under the operation of the controller 150 and the PVR 140. While viewing thus continues, and if the channel of discriminated in the step S440 is a channel other than the subchannel or if no search is attempted, the channel obtained in the step S430*a* is set as the new currently viewed channel (S490). Accordingly, the second tuner 110*b* and the PVR 140 are controlled as before, to store in the step S420 the subchannel of the newly viewed channel.

Fourth Embodiment

In the fourth embodiment of the present invention, a television receiver employs a PIP screen, POP screen, or similar auxiliary-type viewing area or window to display broadcast programs of at least two channels. The display of the television receiver enables multiple windows including screens for separately viewing a broadcast signal on a main area and on an auxiliary area, thereby enabling broadcast programs of two or more channels to be viewed simultaneously. Here, a time-shift function is applied to each channel.

Figure 5:
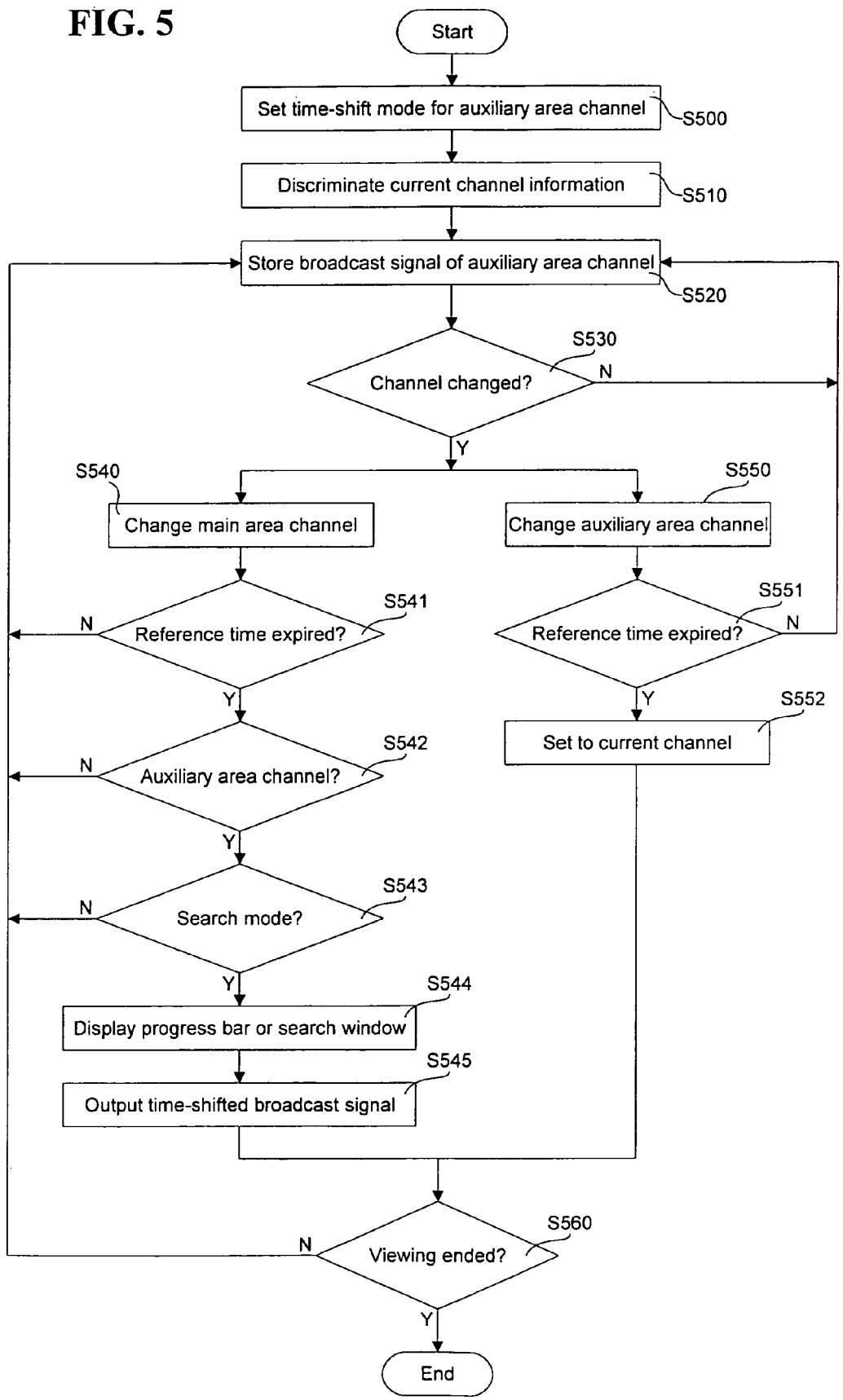
FIG. 5 is a flowchart of a method of controlling a television receiver having a time-shift function according to a fourth embodiment of the present invention.

Referring to FIG. 5, illustrating a method of controlling a television receiver having a time-shift function according to a fourth embodiment of the present invention, the time-shift function is applied to an auxiliary area (PIP/POP) of a currently viewed channel (S500). Upon setting the time-shift function accordingly, the controller 150 discriminates a channel number of the currently received channel from the PSIP data (S510). If the channel number of the currently viewed auxiliary channel is confirmed, the tuner controller 154 of the controller 150 controls the second tuner 110*b* to receive (tune to) the auxiliary area channel.

Upon tuning to the auxiliary area channel, the controller 150 controls the switching controller 153 so that the corresponding broadcast signal is processed via the second demodulator 121*b*, second demultiplexer 122*b*, and second decoder 123*b* and is then stored in the hard disc of the PVR 140 (S520). While the above storage proceeds, the controller 150 continuously discriminates the channel information to determine whether the user performs a channel changing operation to change the currently viewed channel (S530). The presence or absence of the channel changing operation includes detection for a main area channel change (S540) and an auxiliary area channel change (S550). If neither type of channel change occurs, storage of broadcast signals of both the main and auxiliary area channels continues according to the step S520. If the auxiliary area channel is changed instead of the main area channel, the controller 150 determines whether a viewing time of the changed auxiliary area channel exceeds the reference time (S551), and if so, the changed auxiliary area channel is set to a current auxiliary area channel (S552).

On the other hand, if a main area channel changing operation is detected, it is determined whether a viewing time of a recently changed channel exceeds a reference time using the timer 157 (S541). If the viewing time exceeds the reference time, the controller 150 determines whether the changed main area channel corresponds to the auxiliary area channel (S542). If the new channel is the auxiliary area channel, the controller 150 determines using the mode setting unit 155 whether a search mode is entered, which requires the OSD generator 160 to display a progress bar or search window enabling a user control of the time-shift function. That is, it is determined whether the user attempts to search and view previously stored content, such as past scenes, of the auxiliary area channel (S543). If so, the controller 150 enables control of the time-shift function by displaying a progress bar or a search window on the screen via the OSD generator 160 (S544). A position indicator on the progress bar may then be moved to a specific position, corresponding to the time of a past scene, the controller 150 controls the PVR 140 to display the stored broadcast signal of the channel from the time-shifted position, to output video data to the video processor 125 by reading the video data stored in the PVR 140 (S545). Thus, the stored broadcast signal is reproduced according to the user selection and manipulation of the time-shift function, to enable viewing of past content of an auxiliary area channel.

At any time during the above viewing, the controller 150 may detect a user selection or command signal to terminate viewing (S560). In the absence of such detection, display of the broadcast signal of the currently viewed channel and storage of broadcast signals of both the main and auxiliary area channels, to which the time-shift function is applied, continues under the operation of the controller 150 and the PVR 140 in accordance with the step S520. The same storage operation proceeds also in the case of a determination of a relatively short viewing time of a newly changed channel per the step S541, a determination of no correspondence between the auxiliary area channel and the newly changed channel per the step S542, or a determination that there is no attempt by the user to initiate a search for past content in the newly changed auxiliary area channel per the step S543.

It should be appreciated that storage of the auxiliary channel continues per the step S520 unless the user activates a search for past content. That is, since the main area channel and the auxiliary area channel have been determined as the same channel, the user is thus viewing a same broadcast program via each of the main and auxiliary areas. Since it is highly probable that the user will change the main area channel, the controller 150 keeps storing the auxiliary area channel in the PVR 140.

By adopting the present invention, a user is able to apply a time-shift function to a channel or channels that are not currently viewed as well as to a currently viewed channel. In addition, a user is able to view more channels simultaneously.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A display device, comprising:
   at least one tuner for respectively receiving in real time a first composite video signal of a currently viewed channel and receiving a second composite video signal of at least one different channel, wherein the at least one different channel is automatically selected for reception according to a predetermined selection criteria relating the second composite video signal to the first composite video signal;
   a signal processor for respectively processing the first composite video signal and the second composite video signal;

a personal video recorder for enabling a time-shift function by storing the first composite video signal and the second composite video signal, and for reproducing the stored signals according to a user selection of the time-shift function; and a controller for automatically selecting the at least one different channel according to the predetermined selection criteria, and generating display control signals according to a user selection of a display mode, wherein in a real-time display mode at least the first composite video signal is displayed in a real-time, and wherein in a time-shifted display mode at least a time shifted reproduction of the second composite video signal is displayed along with the first composite video signal on different screen areas of the display device.

2. The display device of claim 1, wherein the predetermined selection criteria calls for the selection of the at least one different channel to be a channel discriminated according to program and service information protocol data of the currently viewed channel.

3. The display device of claim 1, wherein the predetermined selection criteria calls for the selection of the at least one different channel to be a channel adjacent to the currently viewed channel according to channel number.

4. The display device of claim 1, wherein the predetermined selection criteria calls for the selection of the at least one different channel to be a channel of a same genre as the currently viewed channel.

5. The display device of claim 1, wherein the predetermined selection criteria calls for the selection of the at least one different channel to be a subchannel of the currently viewed channel.

6. The display device of claim 1, wherein the predetermined selection criteria calls for the selection of the at least one different channel to be a channel having a program rated by a user to be preferred over a plurality of other programs.

7. The display device of claim 1, wherein the at least one tuner comprises a digital signal receiving tuner.

8. The display device of claim 1, wherein the at least one tuner comprises at least two analog signal receiving tuners.

9. The display device of claim 1, wherein the at least one tuner comprises a digital signal receiving tuner and at least one analog signal receiving tuner.

10. The display device of claim 1, further comprising:
a display for displaying the composite video signals selected by the user according to the generated display control signals and according to screen area.

11. The display device of claim 1, further comprising:
an on-screen display (OSD) generator for generating at least one progress bar representing progress statuses of the composite video signals displayed on the different screen areas, said OSD generator outputting the generated at least one progress bar to said signal processor.

12. A method of performing a time-shift function in a display device, the method comprising:
receiving, in real time via at least one tuner, a first composite video signal of a currently viewed channel and a second composite video signal of at least one different channel, wherein the at least one different channel is automatically selected for reception according to a predetermined selection criteria relating the second composite video signal to the first composite video signal;

respectively processing the first composite video signal and the second composite video signal;

storing the first composite video signal and the second composite video signal in a storage medium enabling the time-shift function; and displaying in a real-time display mode at least the first composite video signal, and displaying in a time-shifted display mode at least a time shifted reproduction of the second composite video signal along with the first composite video signal on different screen areas of the display screen.

13. The method of claim 12, wherein the predetermined selection criteria calls for the selection of the at least one different channel to be a channel discriminated according to program and service information protocol data of the currently viewed channel.

14. The method of claim 12, wherein the predetermined selection criteria calls for the selection of the at least one different channel to be a channel adjacent to the currently viewed channel according to channel number.

15. The method of claim 12, wherein the predetermined selection criteria calls for the selection of the at least one different channel to be a channel of a same genre as the currently viewed channel.

16. The method of claim 12, wherein the predetermined selection criteria calls for the selection of the at least one different channel to be a subchannel of the currently viewed channel.

17. The method of claim 12, wherein the predetermined selection criteria calls for the selection of the at least one different channel to be a channel having a program rated by a user to be preferred over a plurality of other programs.

18. The method of claim 12, wherein the at least one tuner comprises a digital signal receiving tuner.

19. The method of claim 12, wherein the at least one tuner comprises at least two analog signal receiving tuners.

20. The method of claim 12, wherein the at least one tuner comprises a digital signal receiving tuner and at least one analog signal receiving tuner.

21. The method of claim 12, wherein the different screen areas are variable in size.

22. The method of claim 12, wherein the different screen areas include a main area and at least one auxiliary area.

23. The method of claim 22, wherein the at least one auxiliary area includes at least one picture-in-picture area.

24. The method of claim 12, further comprising:
displaying at least one progress bar for representing progress statuses of the composite video signals displayed on the different screen areas.

25. The method of claim 24, wherein the at least one progress bar comprises a plurality of progress bars independently showing a progress status of the composite video signal of one channel displayed on each of the different areas, each progress bar having a position indicator for indicating a current progress position of the displayed composite video signal according to a user selection.

26. The method of claim 24, wherein the at least one progress bar comprises one progress bar displayed on one of the different areas only, the progress bar having plural position indicators for indicating current progress positions of the composite video signals displayed on the different areas according to a user selection.

* * * * *